US010987995B2

(12) United States Patent
Akiyama

(10) Patent No.: US 10,987,995 B2
(45) Date of Patent: Apr. 27, 2021

(54) VEHICULAR AIR CONDITIONING DEVICE

(71) Applicant: KEIHIN CORPORATION, Tokyo (JP)

(72) Inventor: Shingo Akiyama, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 257 days.

(21) Appl. No.: 16/367,945

(22) Filed: Mar. 28, 2019

(65) Prior Publication Data
US 2020/0307350 A1 Oct. 1, 2020

(51) Int. Cl.
*B60H 1/00* (2006.01)

(52) U.S. Cl.
CPC ..... *B60H 1/00692* (2013.01); *B60H 1/00857* (2013.01)

(58) Field of Classification Search
CPC ............ B60H 1/00692; B60H 1/00857; B60H 1/0065; B60H 1/00421; B60H 1/00835
See application file for complete search history.

(56) References Cited

U.S. PATENT DOCUMENTS 6,450,246 B1 * 9/2002 Kurokawa ......... B60H 1/00692
165/42
2016/0243922 A1 8/2016 Sekito et al.

FOREIGN PATENT DOCUMENTS

JP 2007-168619 7/2007
JP 2015-110404 6/2015

* cited by examiner

*Primary Examiner* — Jessica Yuen
(74) *Attorney, Agent, or Firm* — Rankin, Hill & Clark LLP

(57) ABSTRACT

A driving force transmission mechanism configuring a vehicular air conditioning device includes: a driving lever coupled to a driving source; a following lever engaged with this driving lever and following this driving lever; and a rack rod engaged with the following lever and moving linearly. A first shaft and a link gear of the following lever are engaged with this rack rod. Moreover, by the driving lever and the following lever revolving under driving action of the driving source, a second shaft engaged with the link gear rotates, and the first shaft rotates via the rack rod. As a result, a first and a second air-mix door engaged with the first and the second shaft slide to undergo an opening/closing operation, and their opening extent characteristics are configured nonlinear under engaging action of a link pin and a link groove of the following lever.

20 Claims, 4 Drawing Sheets

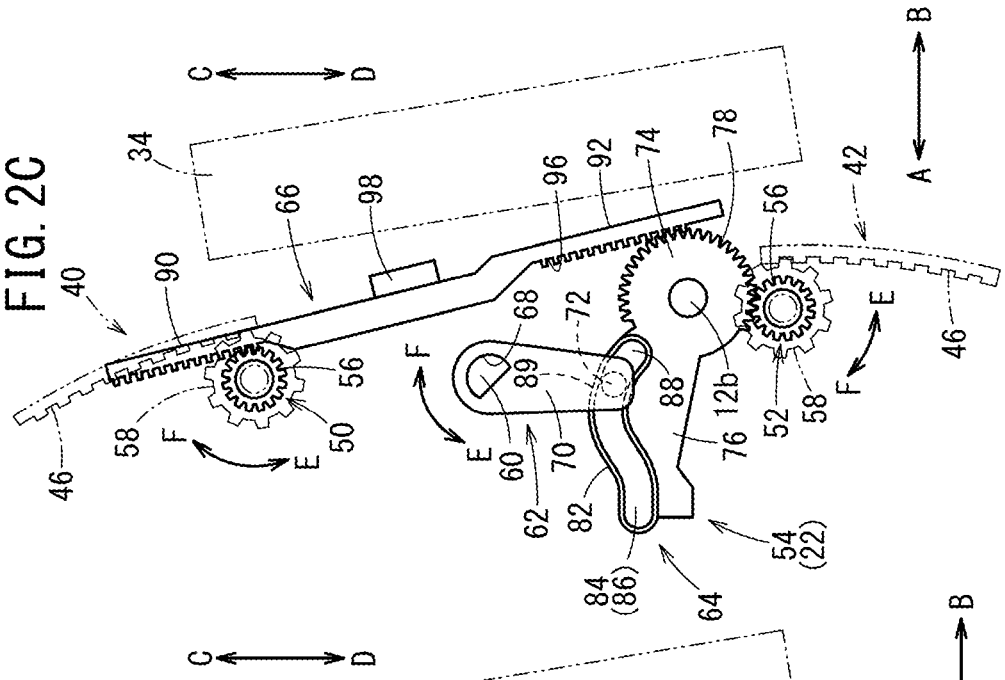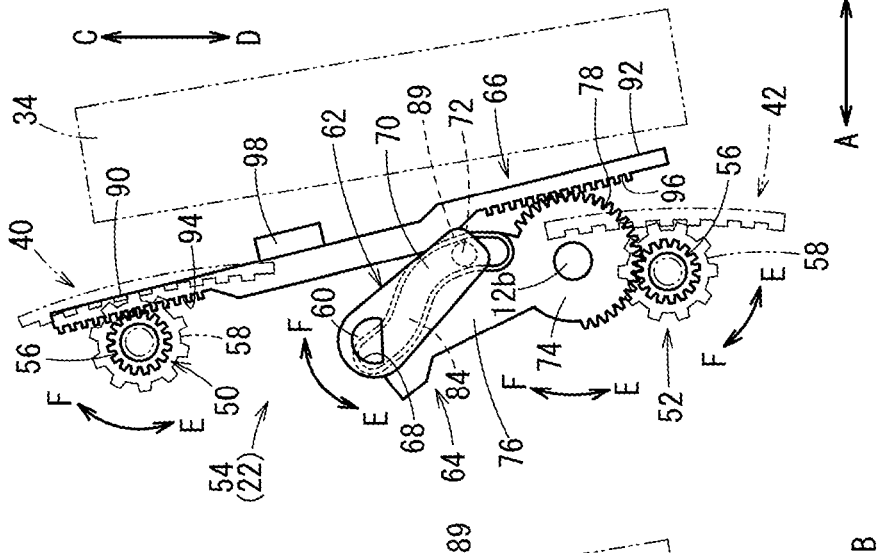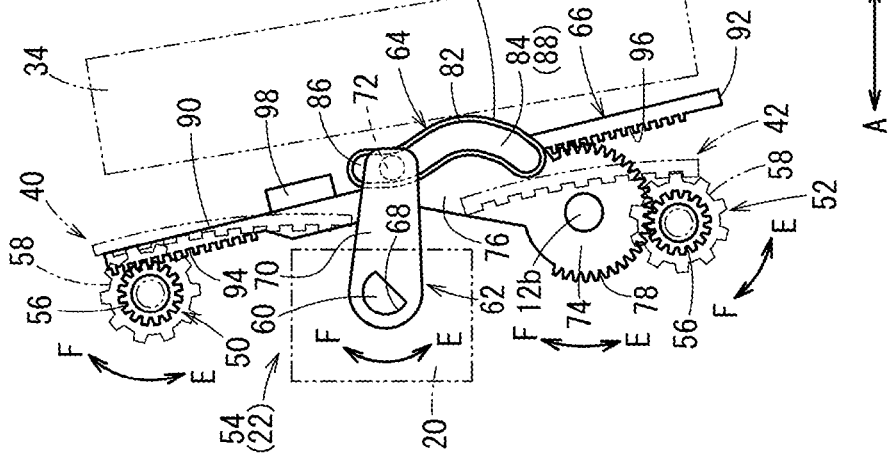

VEHICULAR AIR CONDITIONING DEVICE

BACKGROUND OF THE INVENTION

Field of the Invention

The present invention relates to a vehicular air conditioning device that is installed in a vehicle, and that performs temperature adjustment of a vehicle interior by blowing into the vehicle interior air that has undergone temperature adjustment by a heat exchanger.

Description of the Related Art

Conventionally, as disclosed in, for example, Japanese Laid-Open Patent Publication No. 2015-110404, a vehicular air conditioning device installed in a vehicle includes a first and a second air-mix door that are freely slide-displaceable in an up-down direction inside an air conditioning case. As well as a first external gear of a first shaft being engaged with this first air-mix door and a second internal gear of a second shaft being engaged with this second air-mix door, a first internal gear of the first shaft and a second external gear of the second shaft are each engaged with an end section of a rod-like rack provided so as to be obliquely inclined.

Moreover, by rotating the first shaft, the first air-mix door slides upwardly, and in accompaniment the rack too moves obliquely upwardly, whereby the second shaft rotates in an opposite direction to the first shaft, and the second air-mix door slides downwardly.

In the above-mentioned kind of vehicular air conditioning device, when, for example, the two air-mix doors, that is, the first and the second air-mix door are linked under driving action of a single actuator, and the two doors are respectively set with differing opening extent characteristics, there is a need to employ a link mechanism in order to respectively transmit a driving force of the actuator to the two doors.

As disclosed in, for example, Japanese Laid-Open Patent Publication No. 2007-168619, as a vehicular air conditioning device employing such a link mechanism, a mix door that adjusts a mix ratio of warm air and cool air and a mode door that adjusts an opening/closing extent of a blowout connection port are each provided in a freely revolving manner inside a warm/cool air supply unit, and the mix door and the mode door are respectively coupled to both end sections of a main link in the link mechanism via an operating lever.

Then, by the main link revolving under driving action of the driving source, the operating levers each undergo a swinging operation, and accordingly, the mix door and the mode door revolve in a linked manner.

SUMMARY OF THE INVENTION

However, when the link mechanism of the vehicular air conditioning device disclosed in the above-mentioned Japanese Laid-Open Patent Publication No. 2007-168619 is employed to control the two air-mix doors, that is, the first and the second air-mix door, there is a need to make in advance a space of an operating range that the two operating levers undergo the swinging operation, and another member, and so on, cannot be disposed in this space. Therefore, a large space will be required on an outer side of the air conditioning case where this link mechanism is provided, and this will lead to an increase in size of the vehicular air conditioning device.

On the other hand, when the two air-mix doors, that is, the first and the second air-mix door begin to open from a completely closed state where they have come close to each other, air flows in rapidly to a downstream side via a space between one of the air-mix doors, that is, the first air-mix door, and the other of the air-mix doors, that is, the second air-mix door, and a temperature change of the air increases, hence a change in temperature of blown air blown into the vehicle interior ends up increasing.

Moreover, similarly, when the first and the second air-mix door begin to close from a completely opened state where they have moved away from each other, cool air flows in rapidly to a downstream side via a space between the first air-mix door and second air-mix door and the air conditioning case, whereby a change in temperature of blown air blown into the vehicle interior ends up increasing.

A general object of the present invention is to provide a vehicular air conditioning device that, while achieving downsizing by a simple configuration, is capable of opening/closing two doors by a single driving source, and achieving an improvement in temperature adjustment performance.

The present invention is a vehicular air conditioning device that includes: an air conditioning case having a communicating path through which air flows; and a first and a second door that are provided on an inside of the air conditioning case and that, as well as opening/closing the communicating path, operate in a linked manner, the vehicular air conditioning device including:

a driving source;

a first shaft to which a driving force of the driving source is transmitted and that drives the first door;

a second shaft to which the driving force of the driving source is transmitted and that drives the second door;

a linear driving force transmission section that connects the first shaft and the second shaft in a linked manner, and that performs transmission in such a manner that an output change will be linear with respect to an input change from the driving source; and a nonlinear driving force transmission section that connects the driving source and the linear driving force transmission section, and that performs transmission in such a manner that an output change will be nonlinear with respect to an input change from the driving source, the driving force of the driving source being transmitted to the linear driving force transmission section via the nonlinear driving force transmission section.

Due to the present invention, in a vehicular air conditioning device that includes in an air conditioning case a first and a second door that operate in a linked manner, there are included a first shaft to which a driving force from a driving source is transmitted and that drives the first door, and a second shaft that drives the second door by the driving force, the first shaft and the second shaft are connected in a linked manner by a linear driving force transmission section, and the driving source and the linear driving force transmission section are connected by a nonlinear driving force transmission section. Moreover, the linear driving force transmission section performs transmission in such a manner that an output change will be linear with respect to an input change from the driving source, and the nonlinear driving force transmission section performs transmission in such a manner that an output change will be nonlinear with respect to an input change from the driving source.

Therefore, by the driving force being transmitted to the linear driving force transmission section via the nonlinear driving force transmission section under driving action of a single driving source, the first and the second shaft are driven, and, in accompaniment, the first and the second door can be operated to open/close, and the driving force is transmitted to the first door and the second door from the linear driving force transmission section with nonlinear output characteristics, by the nonlinear driving force transmission section.

As a result, the two doors, that is, the first and the second door can be operated to open/close in a linked manner by the single driving source, and moreover, by configuring the driving force of the driving source to be transmittable via a single linear driving force transmission section, a configuration can be more simplified to achieve greater downsizing compared to a link mechanism of a vehicular air conditioning device according to conventional technology. Moreover, by making an opening/closing operation of the first and the second door nonlinear with respect to the driving force of the driving source, the opening/closing operation of the doors is freely controlled to allow adjustment to a desired temperature, so temperature adjustment performance can be improved.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIGS. 2A, 2B, and 2C are enlarged cross-sectional views showing a vicinity of a link mechanism of a driving force transmission mechanism operating a first and a second air-mix door of the vehicular air conditioning device shown in FIG. 1;

DESCRIPTION OF THE PREFERRED EMBODIMENTS

Figure 1:
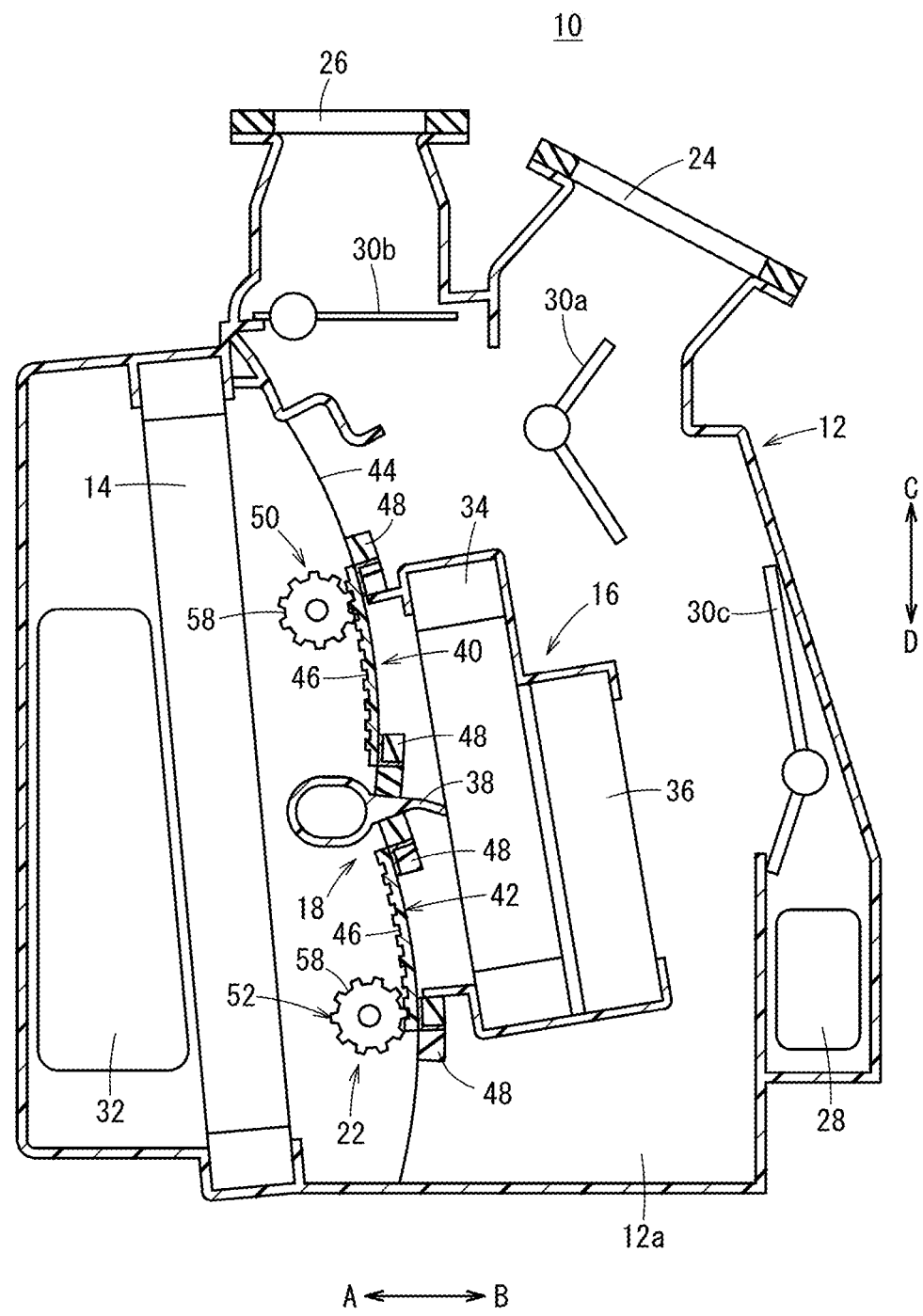
FIG. 1 is an overall cross-sectional view of a vehicular air conditioning device according to an embodiment of the present invention.

As shown in FIG. 1, this vehicular air conditioning device 10 includes: an air conditioning case 12 configuring various communicating paths of air; an evaporator 14 that is arranged on an inside of the air conditioning case 12 and that cools air; a heating unit 16 that heats the air; an air-mix mechanism 18 in which air that has been introduced into the air conditioning case 12 undergoes heat exchange by the evaporator 14 and the heating unit 16, and in which cool air and warm air are mixed with a certain mix ratio to be configured as a mixed air that has undergone temperature adjustment; and a driving force transmission mechanism 22 operated by transmitting to the air-mix mechanism 18 a driving force from a driving source 20 (refer to FIG. 2A) provided on a side surface of the air conditioning case 12.

The followings open above this air conditioning case 12, namely: a vent air-blowing port 24 that blows air to a vicinity of a face of an occupant in a vehicle interior; and a defroster air-blowing port 26 that is adjacent to this vent air-blowing port 24, and blows air to a vicinity of a front window of a vehicle. Note that the defroster air-blowing port 26 is formed so as to be on a vehicle front side (in an arrow A direction), and the vent air-blowing port 24 is formed so as to be on a vehicle rear side (in an arrow B direction). Moreover, a heat air-blowing port 28 that blows air to a vicinity of feet of the occupant in the vehicle interior opens on the vehicle rear side (in the arrow B direction) of the air conditioning case 12.

Moreover, the vent air-blowing port 24, the defroster air-blowing port 26, and the heat air-blowing port 28 have respectively switching doors 30a, 30b, 30c that can be opened and closed and switch an air-blowing state.

On the other hand, the inside of the air conditioning case 12, as well as there being opened therein an opening section 32 by which air is introduced inside the air conditioning case 12 from an unillustrated air blower, is provided with the evaporator 14 at a position representing an upstream side (the arrow A direction) in a flow direction of air, and is provided with the heating unit 16 at a position representing a downstream side (the arrow B direction) with respect to the evaporator 14, separated with a certain spacing from the evaporator 14.

This heating unit 16 is configured from a heater core 34 that heats air by warm water circulating on its inside, and an electric heater 36 provided on a downstream side of this heater core 34 and generating heat under electrification action, for example, and this electric heater 36, due to a heat generating body thereof generating heat based on a control signal from a controller, heats passing air to a certain temperature to be supplied to a downstream side.

Moreover, a dividing rib 38 is provided between the evaporator 14 and the heater core 34, on the inside of the air conditioning case 12. This dividing rib 38 for example faces a vicinity of substantially a central section along a height direction of the heater core 34, and is provided between a first air-mix door 40 and a second air-mix door 42 of the air-mix mechanism 18 that will be mentioned later.

The air-mix mechanism 18 is provided between the evaporator 14 and the heater core 34, is provided in order that when air that has been cooled by the evaporator 14 is caused to flow downstream, the air has its flow amount and its flow state adjusted, and is configured from: the first air-mix door (a door) 40 provided above the dividing rib 38 (in an arrow C direction); and the second air-mix door (a door) 42 provided below the dividing rib 38 (in an arrow D direction).

These first and second air-mix doors 40, 42 are slide doors configured from a plate whose cross section is shaped in an arc with a large radius, for example, and are formed so as to be gently convex in a direction of moving away from the evaporator 14, that is, to a heater core 34 side (in the arrow B direction).

Moreover, the first and second air-mix doors 40, 42 are provided along a width direction of the air conditioning case 12, and are guided in an up-down direction along a substantially arc-shaped guide section 44 provided on an inner wall surface of the air conditioning case 12.

In addition, the first and second air-mix doors 40, 42 each have a rack gear 46 provided on their inner circumferential surface facing the evaporator 14, and these rack gears 46 are each formed linearly along a slide direction of the first and second air-mix doors 40, 42.

Furthermore, a pair of seal members 48 are respectively provided to both end sections along the slide direction of the first and second air-mix doors 40, 42, in regions projecting to the heater core 34 side (in the arrow B direction).

Moreover, the first and second air-mix doors 40, 42 slide, and, as shown in FIG. 1, by the seal members 48 abutting on a wall section of the air conditioning case 12 and on the dividing rib 38, part of communication between an evaporator 14 side and a heating unit 16 side is blocked via the first and second air-mix doors 40, 42.

As shown in FIGS. 1-2C, the driving force transmission mechanism 22 includes: a first and second shaft 50, 52 that are provided in a rotatable manner inside the air conditioning case 12 and are engaged with the first and second air-mix doors 40, 42; and a link mechanism 54 that transmits the driving force of the driving source 20 to the first and second shafts 50, 52.

These first and second shafts 50, 52 for example have their both end sections along their axial direction supported in a rotatable manner by a side wall section 12a of the air conditioning case 12, with the first shaft 50 being provided between the first air-mix door 40 and the evaporator 14, and the second shaft 52 being provided between the second air-mix door 42 and the evaporator 14. Moreover, the first and second shafts 50, 52 are provided in such a manner that the first shaft 50 and the second shaft 52 are separated from each other with a certain spacing in the up-down direction (the arrows C, D direction) sandwiching the dividing rib 38, and are parallel to each other.

The first and second shafts 50, 52 each include: a first gear section 56 that is formed in both end sections in an axial direction representing a side wall section 12a side of the air conditioning case 12, and that has a plurality of gear teeth in its outer circumferential surface; and a second gear section 58 that is formed more to a center side in the axial direction than this first gear section 56 is, and that has a plurality of gear teeth in its outer circumferential surface. These first gear sections 56 are provided on an outer side of the side wall section 12a in the air conditioning case 12 and are engaged with the later-mentioned link mechanism 54, and these second gear sections 58 are respectively engaged with the rack gears 46 of the first and second air-mix doors 40, 42 on the inside of the air conditioning case 12. Note that the second gear section 58 is formed with a larger diameter than the first gear section 56.

As shown in FIGS. 2A-2C, the link mechanism 54 is provided on the outer side of the side wall section 12a in the air conditioning case 12, for example, and includes: a driving lever 62 that is coupled to a drive shaft 60 of the driving source 20 (refer to FIG. 2A) being an actuator, or the like; a following lever (a nonlinear driving force transmission section) 64 that is engaged with the driving lever 62 and follows operation of the driving lever 62; and a rack rod (a linear driving force transmission section, a rack member) 66 that is engaged with the following lever 64 and moves linearly.

The driving lever 62 is integrally coupled to the drive shaft 60 of the driving source 20 by having the drive shaft 60 fitted in a hole section 68 opened in a central section of the driving lever 62, and a first arm section 70 extending linearly with respect to the central section of the driving lever 62 has therein a link pin (a projection) 72 that projects orthogonally to an extension direction of the first arm section 70. The link pin 72 is formed substantially parallel to the drive shaft 60 of the driving source 20, and is disposed so as to be on a side wall section 12a side of the air conditioning case 12.

Moreover, the driving lever 62 is provided in such a manner that the first arm section 70 and the link pin 72 revolve only a certain angle about the central section (the drive shaft 60) under driving action of the driving source 20.

The following lever 64 includes a circular main body section 74 and a second arm section 76 extending outwardly in a radial direction from this main body section 74, and is provided substantially parallel to the driving lever 62 so as to be on an air conditioning case 12 side of the driving lever 62. An outer circumferential surface of the main body section 74 has formed therein along its circumferential direction a link gear (a linear driving force transmission section) 78 having a plurality of gear teeth, and the link gear 78, as well as being engaged with the first gear section 56 of the second shaft 52, is engaged with a second rod gear 96 of the rack rod 66 that will be mentioned later.

Moreover, by a shaft section 12b that projects from the side wall section 12a of the air conditioning case 12 being fitted in a hole section opened in a center of the main body section 74, the following lever 64 is supported by the air conditioning case 12 so as to revolve only a certain angle about the center of the main body section 74.

The second arm section 76 extends in a direction of moving away from the main body section 74, includes a bulging section 82 whose cross section is shaped in substantially an arc bulging in substantially an orthogonal direction to this extension direction, and has a link groove (a groove) 84 formed along the bulging section 82 in its end surface facing the driving lever 62. Moreover, the link pin 72 of the driving lever 62 is inserted in the link groove 84, and by this driving lever 62 revolving, the link pin 72 moves along the link groove 84, whereby the second arm section 76 of the following lever 64 revolves only a certain angle in a certain direction about the main body section 74.

The link groove 84 includes: a first groove section 86 formed in a tip section of the link groove 84 and lying along the extension direction of the second arm section 76; an arc-shaped second groove section 88 formed to a main body section 74 side from an end section of this first groove section 86 and extending along an outer edge section of the bulging section 82; and a third groove section 89 provided midway in the second groove section 88. Note that the third groove section 89 is formed with a more gentle curvature than the second groove section 88.

Note that contrarily to the above-mentioned configuration, there may be adopted a configuration whereby a link pin is provided on a second arm section 76 side, and a link groove in which the link pin is inserted may be provided on a driving lever 62 side.

The rack rod 66 is provided so as to face the first and second shafts 50, 52 in the side wall section 12a of the air conditioning case 12, and is guided so as to move linearly along the side wall section 12a.

This rack rod 66 includes a first rod section 90 formed in one end section of the rack rod 66 and facing the first shaft 50 and a second rod section 92 formed in the other end section of the rack rod 66 and facing the second shaft 52, the first rod section 90 has a first rod gear 94 formed therein along a side surface representing a first shaft 50 side (the arrow A direction), and the first rod gear 94 is engaged with the first gear section 56 of the first shaft 50. The second rod section 92 has the second rod gear 96 formed therein along a side surface representing a second shaft 52 side (the arrow A direction), and the second rod gear 96 is engaged with the link gear 78 of the following lever 64.

That is, the first and second rod gears 94, 96 are each formed on one side surface orthogonal to a moving direction of the rack rod 66.

Moreover, a stopper 98 abuts on the other side surface on a heating unit 16 side (in the arrow B direction) representing an opposite side to the one side surface where the first and second rod gears 94, 96 are provided, of the rack rod 66. This stopper 98 projects from the side wall section 12*a* of the air conditioning case 12, and is formed so as to be parallel to the moving direction of the rack rod 66 and abut on a vicinity of substantially a central section along a longitudinal direction of the rack rod 66. Moreover, the rack rod 66 receives a force biased from the first shaft 50 and the following lever 64 to the heating unit 16 side (in the arrow B direction), due to the stopper 98.

The vehicular air conditioning device 10 according to the embodiment of the present invention basically configured as above will next have its operation and operational advantages described.

First, the case of performing a cooling operation to lower a room temperature of the vehicle interior will be described. Initially, based on a control signal from an unillustrated controller, air that has been taken in under driving action of an unillustrated air blower is supplied to inside the air conditioning case 12 via the opening section 32 and, by passing through the evaporator 14, undergoes heat exchange to be cooled to a certain temperature.

Moreover, by the driving source 20 being driven based on a control signal from the unillustrated controller from a heating operation state shown in FIG. 2C, the drive shaft 60 rotates in a certain direction, the driving lever 62 along with the drive shaft 60 revolve counterclockwise (in an arrow E direction), and by the link pin 72 of the driving lever 62, move from the second groove section 88 toward the first groove section 86 of the link groove 84, and, as shown in FIGS. 2B and 2C, the following lever 64 begins to revolve clockwise (in an arrow F direction) about the main body section 74. Due to this revolution of the following lever 64, the second shaft 52 rotates counterclockwise (in the arrow E direction) and the rack rod 66 moves linearly obliquely downwardly, whereby the first shaft 50 rotates clockwise (in the arrow F direction).

At this time, the rack rod 66, although being pressed to the heating unit 16 side by the first shaft 50 and the following lever 64 engaged with the evaporator 14 side, is received by the stopper 98 provided on the heating unit 16 side (in the arrow B direction), and can thereby move smoothly downwardly.

As a result, as shown in FIG. 2A, the first air-mix door 40 falls along the guide section 44 (refer to FIG. 1) due to clockwise (arrow F direction) rotation of the first shaft 50, while the second air-mix door 42 rises along the guide section 44 due to counterclockwise (arrow E direction) rotation of the second shaft 52.

Moreover, as shown in FIG. 1, the seal member 48 provided at a lower end of the first air-mix door 40 and the seal member 48 provided at an upper end of the second air-mix door 42 each abut on the dividing rib 38, thereby resulting in a state that an upstream side of the heater core 34 is blocked by the first and second air-mix doors 40, 42.

As a result, due to there being a completely closed state where the first and second air-mix doors 40, 42 have come close to each other to abut on the dividing rib 38, the air that has been cooled by the evaporator 14 (cool air) does not flow to the heating unit 16 side, but flows above and below the heater core 34, and is then supplied to the vicinity of the face of the occupant in the vehicle interior, via the vent air-blowing port 24 opened under switching action of the switching door 30*a*.

Next, in the case of performing a heating operation to raise the room temperature of the vehicle interior, the drive shaft 60 of the driving source 20 rotates in an opposite direction to during cooling based on a control signal from the unillustrated controller from a cooling operation state shown in FIG. 2A, whereby the driving lever 62 revolves clockwise (in the arrow F direction), and the link pin 72 of the driving lever 62, by moving on a radius with the drive shaft 60 being at the center, moves from the first groove section 86 to the second groove section 88 of the link groove 84, whereby the following lever 64 begins to revolve counterclockwise (in the arrow E direction) about the main body section 74. Due to this revolution of the following lever 64, the second shaft 52 rotates clockwise (in the arrow F direction) and the rack rod 66 moves linearly obliquely upwardly, whereby the first shaft 50 rotates counterclockwise (in the arrow E direction). As a result, the first air-mix door 40 rises due to rotation of the first shaft 50, and the second air-mix door 42 falls due to rotation of the second shaft 52.

Moreover, as shown in FIGS. 1 and 2C, the seal member 48 provided at an upper end of the first air-mix door 40 and the seal member 48 provided at a lower end of the second air-mix door 42 each abut on a wall section of the air conditioning case 12, thereby resulting in a completely opened state and in a communicated state between a downstream side of the evaporator 14 and the heating unit 16. As a result, the air that has been cooled by the evaporator 14 (cool air) flows to the heating unit 16 representing a downstream side, via a space between the first air-mix door 40 and the second air-mix door 42. Moreover, the link pin 72 is held in the third groove section 89 of the link groove 84.

At this time, since the first and second air-mix doors 40, 42 have a slide speed which is gentle while the link pin 72 of the driving lever 62 is moving along the substantially linearly-formed first groove section 86, and have a slide speed which rises after the link pin 72 of the driving lever 62 has moved to the arc shape-formed second groove section 88, then a rapid inflow to the downstream side of air when the first and second air-mix doors 40, 42 begin to open from the completely closed state is suppressed.

That is, the link pin 72 of the driving lever 62 and the link groove 84 of the following lever 64, by transmitting the driving force from the driving source 20 to the rack rod 66 by nonlinear output characteristics, function as a nonlinear driving force transmission section capable of controlling opening/closing speeds of the first and second air-mix doors 40, 42.

Air, after having been heated by the heater core 34 and the electric heater 36 to become warm air, is supplied to the vicinity of the feet of the occupant in the vehicle interior, via the heat air-blowing port 28 opened under switching action of the switching door 30*c*.

As described above, in the present embodiment, the vehicular air conditioning device 10 having the first and second air-mix doors 40, 42 for adjusting the mix ratio of cool air and warm air includes the driving force transmission mechanism 22 that transmits the driving force of the driving source 20 to these first and second air-mix doors 40, 42, and this driving force transmission mechanism 22 includes: the first and second shafts 50, 52 that are provided in a rotatable manner inside the air conditioning case 12 and are engaged with the first and second air-mix doors 40, 42; the driving lever 62 that is coupled to the drive shaft 60 of the driving source 20; the following lever 64 that is engaged with the driving lever 62 and follows according to operation of the driving lever 62; and the link mechanism 54 including the rack rod 66 that is engaged with the following lever 64 and moves linearly.

It therefore becomes possible to revolve each of the driving lever 62 and the following lever 64 under driving action of the driving source 20 to rotate the second shaft 52 and to perform an advancing/retracting operation on the rack rod 66 and rotate the first shaft 50, and thereby slide the first and second air-mix doors 40, 42 engaged with the first and second shafts 50, 52.

As a result, two air-mix doors, that is, the first and second air-mix doors 40, 42 can be operated to open/close in a linked manner by a single driving source, that is, the driving source 20, and, moreover, by the driving force of the driving source 20 being configured transmittable via the rack rod 66, a configuration of the link mechanism 54 can be more simplified and greater downsizing can be achieved compared to a link mechanism of a vehicular air conditioning device according to conventional technology.

In other words, since the two air-mix doors, that is the first and second air-mix doors 40, 42 do not each need to be provided with a link mechanism, and can be operated to open/close via a single rack rod, that is, the rack rod 66, then it becomes possible to achieve a reduction in the number of components.

Moreover, since operation trajectories of the driving lever 62, the following lever 64, and the rack rod 66 configuring the link mechanism 54 are disposed so as to overlap in the axial direction of the first and second shafts 50, 52 (the width direction of the air conditioning case 12), then space on an outer side of the air conditioning case 12 can be effectively used, and space-saving and downsizing of the device can be achieved.

Furthermore, by appropriately setting a shape of the link groove 84 of the link pin 72 in the driving lever 62, an opening extent change (a moving speed) when the first air-mix door 40 and the second air-mix door 42 begin to move away from each other from the completely closed state can be made more gentle, so a rapid inflow to the heating unit 16 side of cool air at the start of opening is suppressed, and a rapid change in blown air temperature can be prevented. That is, opening extent characteristics of the first and second air-mix doors 40, 42 can each be set.

Figure 3:
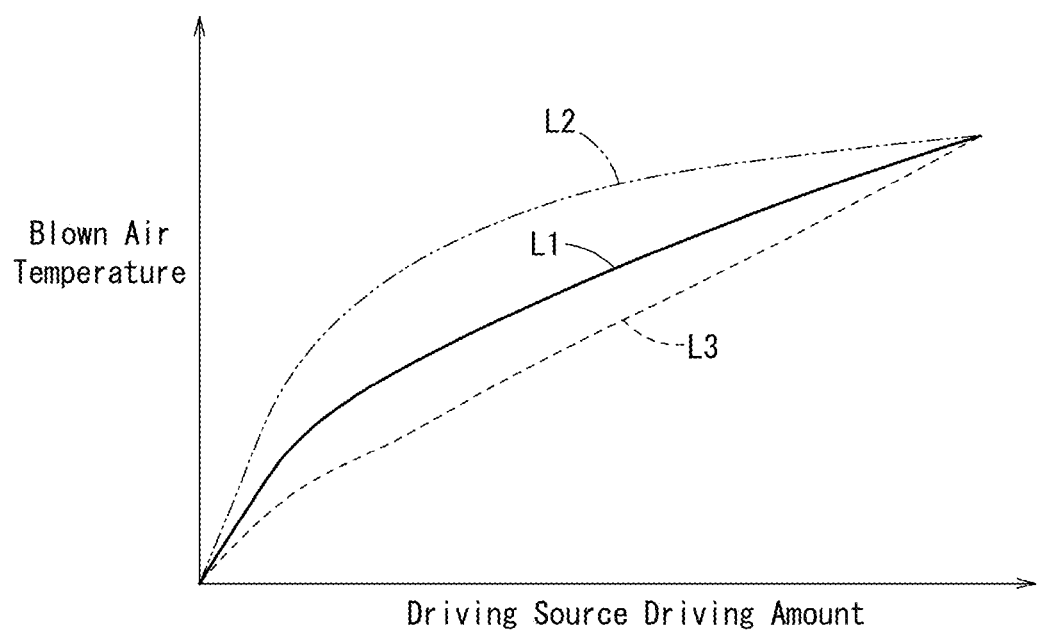
FIG. 3 is a characteristic curve diagram showing a relationship between blown air temperature and driving source driving amount in the vehicular air conditioning device shown in FIG. 1.

Now, a relationship between driving amount of the driving source 20 and blown air temperature—temperature of air blown to the vehicle interior—will be described with reference to the characteristic curve diagram of FIG. 3. Note that in FIG. 3, characteristics of the vehicular air conditioning device 10 according to the present embodiment are shown by the solid line L1, characteristics of a vehicular air conditioning device according to conventional technology are shown by the two dot-chain line L2, and characteristics representing a target value (a setting value) are shown by the broken line L3.

As may be understood from the characteristics representing the target value (the setting value) shown by this broken line L3, when the driving source 20 is driven such that a door opening extent changes from the completely closed state where communication between the evaporator 14 and the heating unit 16 has been blocked by the first and second air-mix doors 40, 42 to the completely opened state, the blown air temperature changes substantially linearly. That is, substantially linear characteristics are shown.

On the other hand, it may be understood that, as shown in the two dot-chain line L2, the characteristics of the vehicular air conditioning device according to conventional technology have a higher blown air temperature than the characteristics of the target value, and moreover, change not in a direct linear manner, but in a curved nonlinear manner. That is, the driving amount of the driving source 20 representing a vicinity of an intermediate position of the door opening extent is shown to end up having a blown air temperature which is higher than the setting value (the target value). In contrast, it may be understood that in the above-mentioned embodiment, the blown air temperature is closer to the target value even compared to the characteristics of the vehicular air conditioning device according to conventional technology, and moreover, shows substantially linear characteristics.

By thus setting each of the opening extent characteristics such that start of opening from a time of complete closure of the first and second air-mix doors 40, 42 will be gentle, temperature change of air blown into the vehicle interior can be made substantially linear, and moreover, a rapid temperature change can be suppressed.

Furthermore, by providing the first and second rod gears 94, 96 only on one side surface orthogonal to the moving direction of the rack rod 66, directions that loads from the engaged first shaft 50 and following lever 64 are applied will be the same directions, so deformation of the rack rod 66 is suppressed, and, as well as it being possible for this rack rod 66 to be smoothly moved linearly, it is possible for a quantity of the stopper 98 provided on the other side surface representing an opposite side to the one side surface, to be set to a minimum.

Figure 4B:
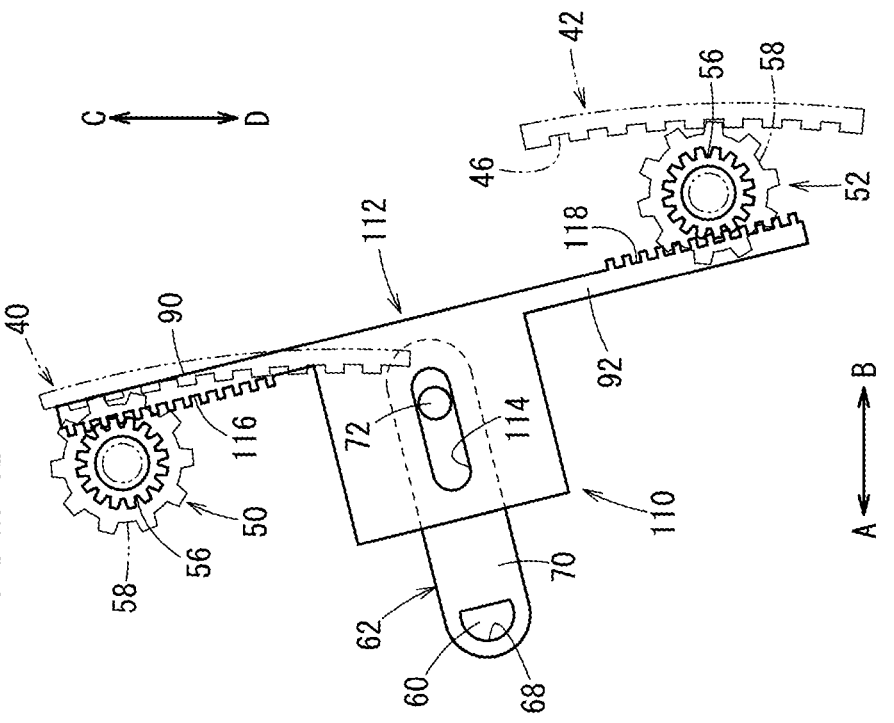
FIG. 4B is an enlarged front view showing a vicinity of a link mechanism according to a second modified example.
Figure 4A:
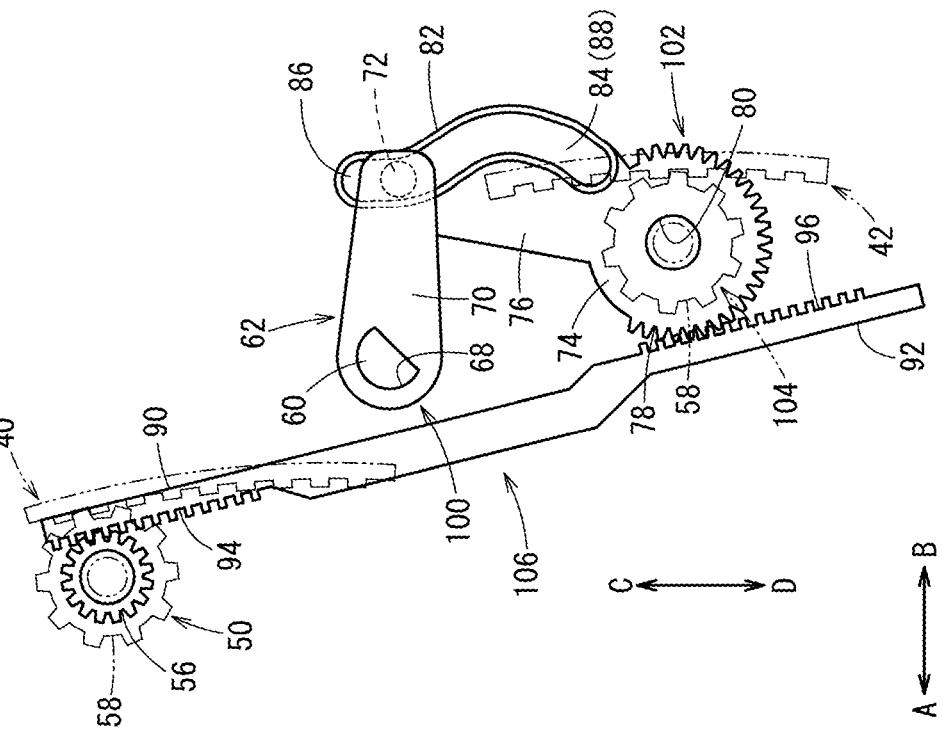
FIG. 4A is an enlarged front view showing a vicinity of a link mechanism according to a first modified example.

Moreover, the link mechanism 54 of the driving force transmission mechanism 22 is not limited to the case of being configured from the above-mentioned driving lever 62, following lever 64, and rack rod 66, and may be given a configuration where, for example, as in a link mechanism 100 shown in FIG. 4A, an end section of a second shaft 104 is directly coupled to a hole section 80 of the main body section 74 in a following lever 102, and the link mechanism 100 is disposed on an opposite side to the first shaft 50 sandwiching a rack rod 106.

In such a configuration, by the driving lever 62 and the following lever 102 revolving under driving action of the driving source 20, the second shaft 104 coupled to the main body section 74 rotates integrally, and the rack rod 106 engaged with the link gear 78 of this following lever 102 moves linearly, whereby the engaged first shaft 50 rotates. As a result, the first and second air-mix doors 40, 42 respectively slide in opposite directions due to rotation of the first shaft 50 and the following lever 102.

That is, in this configuration, since there is no need for the second shaft 104 to be provided with the first gear section 56 engaged with the following lever 102, then a reduction of manufacturing costs and a simplification of configuration can be achieved, and since the main body section 74 and the second shaft 104 are disposed coaxially, space on the outer side of the air conditioning case 12 can be effectively used.

Furthermore, a configuration may be adopted where, as in a link mechanism 110 shown in FIG. 4B, the above-mentioned following levers 64, 102 are done away with, and a link groove 114 in which the link pin 72 of the driving lever 62 is inserted is provided in a central section along a longitudinal direction of a rack rod 112.

This rack rod 112 is formed such that the link groove 114 is formed long along an orthogonal direction to the longitudinal direction of the rack rod 112 and such that a first rod gear 116 will be on an evaporator 14 side (in the arrow A direction) and a second rod gear 118 will be on a heater core 34 side (in the arrow B direction), the first gear section 56 of the first shaft 50 disposed on the evaporator 14 side of this rack rod 112 is engaged with the first rod gear 116, and the first gear section 56 of the second shaft 52 disposed on the heating unit 16 side of the rack rod 112 is engaged with the second rod gear 118. That is, the first shaft 50 and the second shaft 52 are disposed alternately sandwiching the rack rod 112.

In this link mechanism 110, by the driving lever 62 revolving under driving action of the driving source 20, the link pin 72 moves along the link groove 114 of the rack rod 112, whereby the rack rod 112 moves linearly in the up-down direction. Although the first and second shafts 50, 52 each rotate due to this movement of the rack rod 112, a rotating direction of the first shaft 50 and a rotating direction of the second shaft 52 will be opposite directions. As a result, the first air-mix door 40 engaged with the first shaft 50 and the second air-mix door 42 engaged with the second shaft 52 respectively slide in opposite directions.

Moreover, although the above-mentioned embodiment and modified examples described the case where the driving force transmission mechanism 22 including the link mechanism 54 operates under driving action of the driving source 20 such as an actuator that is driven by a control signal from a controller, the present invention is not limited to this, and it is possible that when, for example, an air-blowing mode is switched by manual operation of an operating lever, or the like, by an operator, the drive source 20 is driven by an operating force due to the operator.

Furthermore, the link mechanism 54 of the driving force transmission mechanism 22 is not limited to a rack-and-pinion configuration where a pinion gear like the link gear 78 of the following lever 64 and a rack gear like the first and second rod gears 94, 96 of the rack rod 66 are engaged with each other, and there may be adopted a configuration where, for example, mutual engagement is achieved by the likes of a worm gear, a bevel gear, and a face gear.

Note that the vehicular air conditioning device according to the present invention is not limited to the above-mentioned embodiment and may of course adopt a variety of configurations without departing from the spirit of the present invention.

What is claimed is:

1. A vehicular air conditioning device that includes: an air conditioning case having a communicating path through which air flows; and a first and a second door that are provided on an inside of the air conditioning case and that, as well as opening/closing the communicating path, operate in a linked manner, the vehicular air conditioning device comprising:
    a driving source;
    a first shaft to which a driving force of the driving source is transmitted and that drives the first door;
    a second shaft to which the driving force of the driving source is transmitted and that drives the second door;
    a linear driving force transmission section that connects the first shaft and the second shaft in a linked manner, and that performs transmission in such a manner that an output change will be linear with respect to an input change from the driving source; and
    a nonlinear driving force transmission section that connects the driving source and the linear driving force transmission section, and that performs transmission in such a manner that an output change will be nonlinear with respect to an input change from the driving source, the driving force of the driving source being transmitted to the linear driving force transmission section via the nonlinear driving force transmission section.

2. The vehicular air conditioning device according to claim 1, wherein
    in a vicinity of a state where the first and the second door have come closest to each other or a state where the first and the second door have moved furthest away from each other, an opening extent change of the door with respect to a driving amount of the driving source is set smaller than an opening extent change of the door in a region other than close to complete closure.

3. The vehicular air conditioning device according to claim 2, wherein
    the linear driving force transmission section is a rack member engaged with the shaft.

4. The vehicular air conditioning device according to claim 3, wherein
    the nonlinear driving force transmission section and the linear driving force transmission section have at least part of operation trajectories overlapping in an axial direction of the shaft.

5. The vehicular air conditioning device according to claim 4, wherein
    the first and the second door are slide doors.

6. The vehicular air conditioning device according to claim 5, wherein
    the first and the second door operate in opposite directions to each other.

7. The vehicular air conditioning device according to claim 1, wherein
    the linear driving force transmission section is a rack member, comprises a gear section only on one side representing an orthogonal direction to a moving direction of the rack member, and has the gear section engaged with the shaft.

8. The vehicular air conditioning device according to claim 7, wherein
    the nonlinear driving force transmission section and the linear driving force transmission section have at least part of operation trajectories overlapping in an axial direction of the shaft.

9. The vehicular air conditioning device according to claim 8, wherein
    the first and the second door are slide doors.

10. The vehicular air conditioning device according to claim 9, wherein
    the first and the second door operate in opposite directions to each other.

11. The vehicular air conditioning device according to claim 1, wherein
    the first and the second shaft are connected to each other by the linear driving force transmission section being a rack member, via a gear, and
    the rack member is provided with a groove or projection engaged with the nonlinear driving force transmission section, while the nonlinear driving force transmission section is provided with a projection or groove engaged with the rack member.

12. The vehicular air conditioning device according to claim 11, wherein
    the nonlinear driving force transmission section and the linear driving force transmission section have at least part of operation trajectories overlapping in an axial direction of the shaft.

13. The vehicular air conditioning device according to claim 12, wherein
    the first and the second door are slide doors.

14. The vehicular air conditioning device according to claim 13, wherein
    the first and the second door operate in opposite directions to each other.

15. A vehicular air conditioning device that includes: an air conditioning case having a communicating path through which air flows; and a first and a second door that are provided on an inside of the air conditioning case and that, as well as opening/closing the communicating path, operate in a linked manner, the vehicular air conditioning device comprising:

a driving source;
a first shaft that drives the first door by a driving force of the driving source;
a second shaft that drives the second door by the driving force of the driving source;
a linear driving force transmission section that connects the first shaft and the second shaft in a linked manner, and that performs transmission in such a manner that an output change will be linear with respect to an input change from the driving source; and
a nonlinear driving force transmission section that connects the driving source and the first shaft, and that performs transmission in such a manner that an output change will be nonlinear with respect to an input change from the driving source,
the driving force of the driving source being transmitted to the linear driving force transmission section via the nonlinear driving force transmission section.

16. The vehicular air conditioning device according to claim 15, wherein
in a vicinity of a state where the first and the second door have come closest to each other or a state where the first and the second door have moved furthest away from each other, an opening extent change of the door with respect to a driving amount of the driving source is set smaller than an opening extent change of the door in a region other than close to complete closure.

17. The vehicular air conditioning device according to claim 16, wherein
the linear driving force transmission section is a rack member engaged with the shaft.

18. The vehicular air conditioning device according to claim 17, wherein
the nonlinear driving force transmission section and the linear driving force transmission section have at least part of operation trajectories overlapping in an axial direction of the shaft.

19. The vehicular air conditioning device according to claim 18, wherein
the first and the second door are slide doors.

20. The vehicular air conditioning device according to claim 19, wherein
the first and the second door operate in opposite directions to each other.

* * * * *